July 5, 1927.
D. C. SLAGHT
SAWING MACHINE
Filed Oct. 3, 1925
1,634,692
4 Sheets-Sheet 1
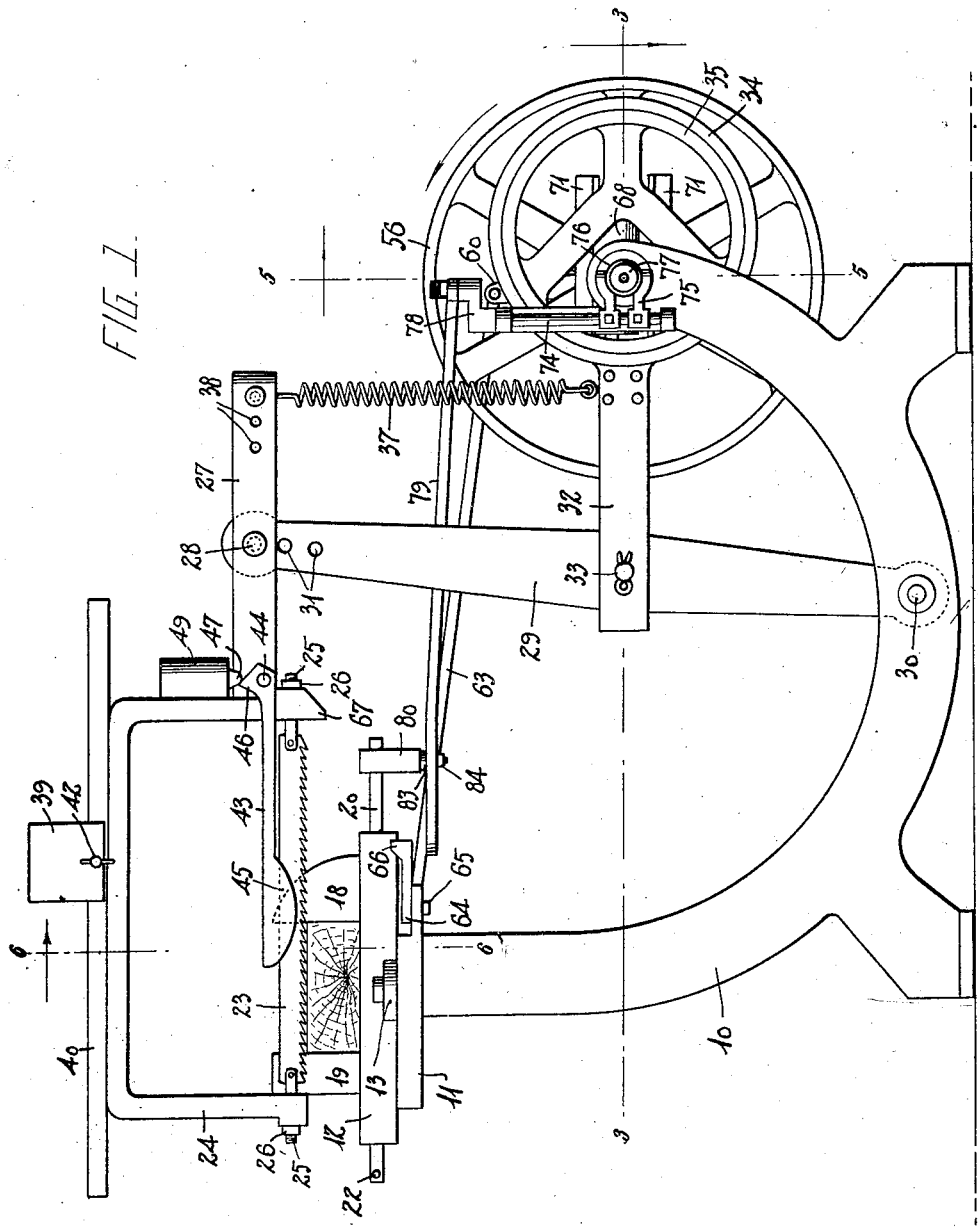
Inventor:
D. C. Slaght,
By Monroe E. Miller
Attorney.

July 5, 1927. 1,634,692
D. C. SLAGHT
SAWING MACHINE
Filed Oct. 3, 1925     4 Sheets-Sheet 2
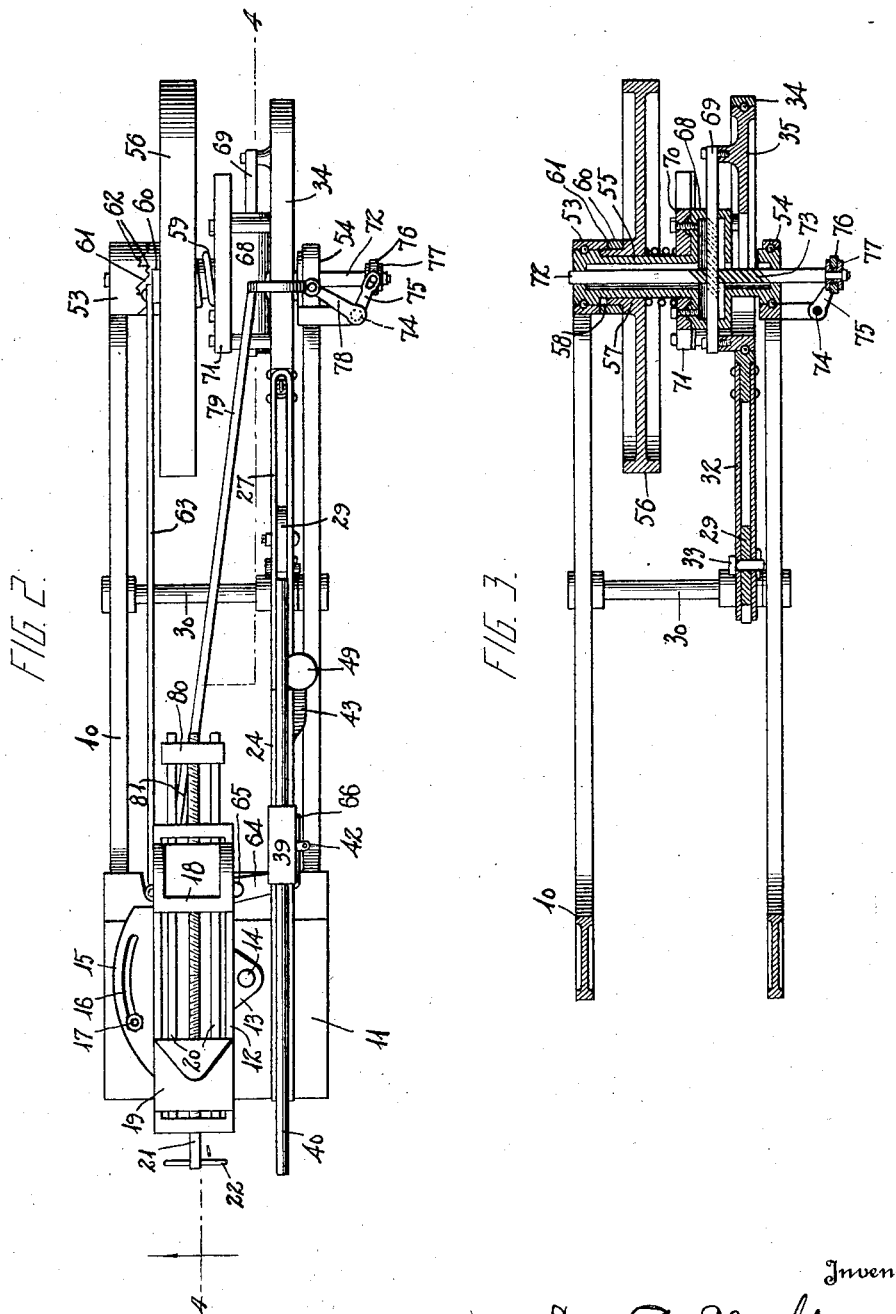
Inventor:
D. C. Slaght,
By Monroe E. Miller
Attorney.

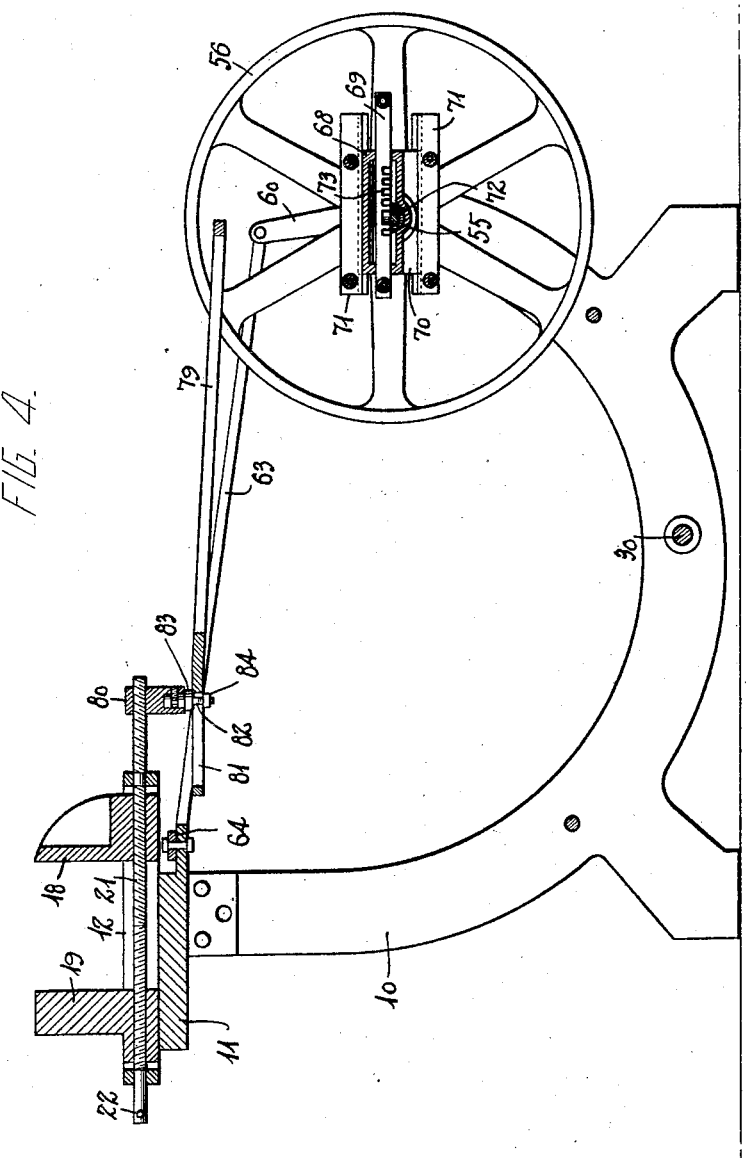

July 5, 1927.
D. C. SLAGHT
SAWING MACHINE
Filed Oct. 3, 1925
1,634,692
4 Sheets-Sheet 4
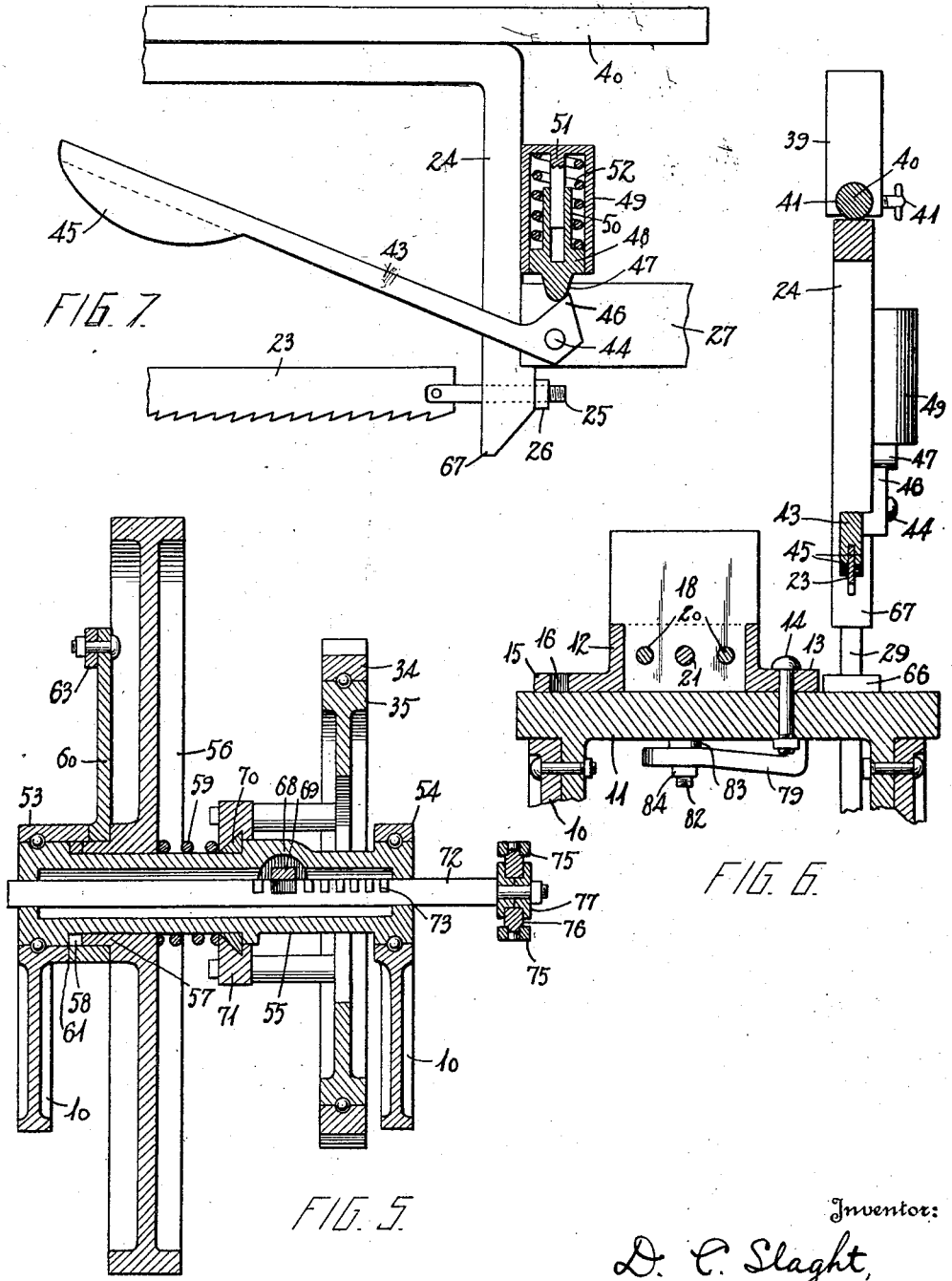

Patented July 5, 1927.

1,634,692

UNITED STATES PATENT OFFICE.

DANIEL C. SLAGHT, OF EASTON, PENNSYLVANIA.

SAWING MACHINE.

Application filed October 3, 1925. Serial No. 60,227.

The present invention relates to sawing machines, and one object of the invention is the provision of a novel operating mechanism for a saw blade operable to automatically regulate the length of the stroke according to the width of the work or object to be cut.

Another object is the provision of adjustable power driven means for reciprocating the saw blade, an adjustable vise or clamp for holding the work or object, and an operative connection between said vise or clamp and said means to adjust the stroke of the saw blade in accordance with the adjustment of the vise or clamp for objects of different widths or sizes.

Still another object is the provision of novel means for obtaining an adjustment in the length of the stroke of the saw blade during the reciprocation thereof, and without stopping the machine.

A further object is the provision of novel means for mounting and controlling the saw blade in order that it will effectively cut through the object.

A still further object is the provision of a novel device to prevent distortion of the saw blade when started into the object.

It is also an object of the invention to improve the machine generally in its construction and arrangement of the component elements to enhance the utility and efficiency thereof.

With the foregoing and other objects in view, which will be apparent as the description proceeds, the invention resides in the construction and arrangement of parts as hereinafter described and claimed, it being understood that changes can be made within the scope of what is claimed, without departing from the spirit of the invention.

The invention is illustrated in the accompanying drawings, wherein—

Figure 1 is a side elevation of the machine.

Fig. 2 is a plan view thereof.

Fig. 3 is a horizontal section on the line 3—3 of Fig. 1.

Fig. 4 is a vertical section on the line 4—4 of Fig. 2.

Figs. 5 and 6 are enlarged sectional views on the respective lines 5—5 and 6—6 of Fig. 1.

Fig. 7 is a detail view of the device for preventing distortion of the saw blade when starting into the object, with the blade holder disengaged from the blade as when the blade is cutting through the object.

A suitable frame 10 is provided having a bed plate 11 on which the work holder is mounted. Such work holder comprises an adjustable vise or clamp including the jaw guide 12 having an ear or flange 13 at one side pivoted, as at 14, on the plate 11, and said guide is provided at its other side with a flange 15 having a curved slot 16 receiving a clamping bolt 17 carried by the plate 11, whereby when the bolt 17 is loosened the work holder may be adjusted about the vertical axis of the pivot 14 in order that the object to be cut may be disposed at different angles relatively to the saw for obtaining square and mitre cuts. Jaws 18 and 19 are slidable in the guide 12, and rods 20 are secured in said guide and the jaws have apertures receiving said rods so as to hold the jaws in the guide for longitudinal movement therein. A right and left hand screw 21 is mounted for rotation in the guide between the rods 20 and the jaws 18 and 19 engage the opposite threads of said screw so that the jaws are moved toward and away from one another when the screw is rotated in opposite directions. The forward end of the screw has a suitable handle 22 for conveniently rotating the screw to adjust the jaws of the vise or clamp.

A hack saw is used, comprising the saw blade 23 secured to the terminal portions of a yoke or frame 24. As shown, stems 25 are secured to the ends of the saw blade and extend through the yoke 24 and have nuts 26 thereon bearing against the yoke for holding the blade taut.

In order to mount and reciprocate the saw, the yoke or frame 24 has a rearwardly extending shank or arm 27 which is pivoted, as at 28, to the upper portion of a lever 29 which has its lower end pivotally mounted, as at 30, in the frame. The lever 29 has longitudinally spaced apertures 31 to receive the pivot 28, in order to adjust the saw and regulate the stroke thereof. The shank or arm 27 is pivoted between its ends to the lever 29, and said lever is oscillated to reciprocate the saw. Thus, a bar 32 is pivoted, as at 33, to the lever 29 between the ends of said lever, and said bar is secured to a band 34 embracing an eccentric 35, whereby the rotation of the eccentric will oscillate the lever 29, and thereby reciprocate the saw.

A tension spring 37 is connected to the bar 32 and the rear portion of the shank 27, said shank having a series of apertures 38 for the adjustable connection of the spring to regulate the tension. The spring 37 is employed in order to exert a lifting effect on the saw during the return stroke of the saw, the saw blade 23 having its teeth so formed as to cut during the forward movement of the saw. The eccentric 35 rotates counterclockwise, as seen in Fig. 1, so that when the eccentric moves upwardly and forwardly, the lever 29 is swung forwardly to move the saw forwardly through its active stroke, and the bar 32 being raised will relieve the tension on the spring 37, in order that the saw may bear down on the object which is being cut. When the eccentric moves downwardly and rearwardly to swing the lever 29 rearwardly and return the saw through its idle stroke, the bar 32 is moved downwardly, thereby pulling on the spring 37, and increasing the tension of the spring. This tension will pull down on the rear end of the shank or arm 27 of saw, thereby exerting a lifting effect on the saw, so as to relieve the pressure of the saw blade on the object. This enables the saw blade to return rearwardly freely and to clear the sawdust from the kerf being cut.

The saw is provided with a weight 39 so that the saw blade is made to bear down on the object. In order to mount the weight adjustably on the saw, a rod 40 is secured on the yoke or frame 24, and the weight has a slot 41 in the bottom thereof engaging said rod, and a set screw 42 is carried by the weight to clamp the weight in its adjusted position on the rod. When the set screw is loosened the weight may be shifted lengthwise of the saw. By moving the weight away from and toward the pivot 28 it will be apparent that the effect of the weight will be increased and decreased accordingly, in order that the pressure on the saw blade may be regulated.

As a means for preventing distortion of the saw blade 23 when it starts into the object there is provided an arm 43 which is pivoted, as at 44, to the shank 27 so as to extend longitudinally over the blade 23, and said arm has depending flanges 45 to overlap the opposite sides of the blade when said arm is swung downwardly, as seen in Figs. 1 and 6. The blade being fitted snugly between the flanges 45 will prevent the blade from turning or twisting out of its proper plane when the teeth start to cut into the object, and as the blade cuts down into the object the curved edges of the flanges 45 will bear on the object, thereby swinging the arm 43 upwardly relatively to the saw.

The arm 43 has a lug 46 at its pivoted end which is movable under a lug 47 depending from a spring-pressed plunger 48 that is slidable in a cylinder 49 secured to the rear end portion of the yoke or frame 24. The plunger 48 has an upstanding tubular portion 50 receiving a depending finger 51 in the cylinder 49, so as to guide the plunger 48, and a coiled spring 52 is confined in the cylinder 49 between the upper end of the cylinder and the plunger 48, so as to force said plunger downwardly against the lug 46. When the arm 43 is down against the saw blade, the lug 46 is in front of the lug 47, as seen in Fig. 1, whereby the plunger 48 will hold the arm 43 in active position. When the arm 43 is swung upwardly away from the saw blade by the movement of the blade downwardly through the object, the lug 46 will move under the lug 47, thereby forcing the plunger 48 upwardly, and when the arm 43 has been swung a predetermined distance, the plunger 48 being forced downwardly by the spring 52 will cause the lug 47 to move down in front of the lug 46, thereby swinging the arm 43 upwardly to the position as shown in Fig. 7. This will support the arm up away from the saw blade out of contact with the work. The arm 43 may be readily swung downwardly against the saw blade when starting the machine. When the arm 43 is raised away from the saw blade by the movement of the saw blade into the work, the lug 46 will move under the lug 47 with a quick or snapping motion so as to raise the arm 43 away from the object or work with a quick movement, thereby avoiding the dragging of the arm 43 on the object during the sawing operation after the saw blade has started into the object.

The frame 10 is provided at its rear end with bearings 53 and 54 in which a tubular shaft 55 is journaled for rotation, and a pulley wheel 56 is mounted on said shaft for rotary and sliding movements thereon. Said pulley wheel is driven from an electric motor or other source of power. The hub 57 of the pulley wheel and shaft 55 have interengageable clutch teeth 58, and a coil spring 59 on the shaft 55 at the opposite side of the pulley wheel moves or shifts the pulley wheel on the shaft to engage the clutch teeth with one another so that the shaft will rotate with the pulley wheel.

A lever 60 is mounted for rotation on the hub 57 between the wheel 56 and bearing 53, and said bearing and lever have annular series of cams 61 engaging one another and so arranged that when the lever 60 is swung rearwardly, said lever projecting upwardly from the shaft 55, the cams 61 will force the wheel 56 against the spring 59 so as to separate the clutch teeth 58. This will open the clutch between the wheel 56 and shaft 55 so that the shaft will not rotate with said wheel. The wheel 56 may be rotated continuously during the operation of the machine. When the lever 60 is moved forwardly the cams 61 move together and the spring 59 will shift the wheel 56 to close the clutch. The cams 61 have notches 62 to engage one another when the clutch is opened, so as to prevent the spring 59 from returning the parts and closing the clutch, until the lever 60 is moved forwardly.

An automatic control for the clutch is provided. Thus, a link or bar 63 is pivoted at one end to the lever 60 and is pivoted at its opposite end to a trip lever 64 fulcrumed between its ends, as at 65, on the bed plate 11. The lever 64 and rear end of the saw frame or yoke 24 have the respective cooperable cam lugs 66 and 67 adapted to abut during the forward movement of the saw when the saw blade has cut down through the object, whereby the lever 64 is swung to move the bar 63 and lever 60 rearwardly, so as to open the clutch. The opposite sides of the lugs 66 and 67 are bevelled so that the lug 67 will ride over the lug 66 during the return or backward movement of the saw.

The stroke of the saw is regulated by changing the eccentricity of the eccentric with reference to the shaft 55 or axis of rotation of the driving member. The eccentric 35 is therefore mounted for adjustment relatively to the shaft 55. The shaft 55 has a transverse tubular portion 68 in which a bar 69 is slidable transversely of the axis of said shaft, and the terminals of the bar 69 are secured to the eccentric 35. A guide member 70 is fitted on the shaft 55 and is secured to the portion 68, and slide bars or rails 71 are secured to the eccentric 35 parallel with the bar 69 to assist in guiding the eccentric for adjustment along its median diameter transversely of the shaft 55. The eccentric is therefore mounted for sliding adjustment on the shaft 55 transversely of the axis of said shaft, to bring the center of the eccentric closer to or farther from the axis of the shaft, which will decrease or increase the amount of oscillation of the lever 29 and amount of linear movement of the saw.

The eccentric may be adjusted during the rotation thereof. Thus, a bar 72 is slidable in the shaft 55 along the axis thereof, and the bars 69 and 72 cross one another and have interengaging oblique teeth 73, in order that when the bar 72 is slid longitudinally of the axis of the shaft, the bar 69 is slid transversely of said axis to shift the eccentric on the shaft. A rock shaft 74 is carried by the frame 10 and has arms 75 pivotally engaged with a ring or collar 76 that is swivelled in a head 77 secured to the corresponding end of the bar 72. The shaft 74 has another arm 78 connected by a link or bar 79 with an adjusting member 80 that is slidable on the rear protruding terminals of the rods 20. The member 80 engages the rear protruding terminal of the screw 81, so that the member 80 is adjusted forwardly and rearwardly with the jaw 18. The position of the member 80 is determined by the adjustment of the vise or clamp, and when the vise is opened and closed the member 80 is moved rearwardly and forwardly accordingly. Thus, the adjustment of the vise or work holder will automatically control the eccentricity of the eccentric 35, to regulate the stroke of the saw in proportion. Thus, when the vise or work holder is opened for an object or article of larger width, the link 79 is moved rearwardly turning the shaft 74 to move the bar 72 toward the observer, as seen in Figs. 2 and 3. This will move the bar 69 toward the right, thereby adjusting the eccentric to move the center thereof farther away from the axis of the shaft 55. This will increase the stroke of the saw. Conversely, when the vise or work holder is closed more or less, for clamping an object of smaller size, the member 80 is moved forwardly, thereby pulling the bar or link 79 with it, and moving the bar 72 away from the observer, as seen in Figs. 2 and 3. This will move the bar 69 toward the left thereby shifting the eccentric to bring the center thereof closer toward the axis of the shaft 55. This will shorten the stroke of the saw. This adjustment of the eccentric may be obtained with the eccentric in any position thereof and even during the rotation of the eccentric if the clutch is closed.

In order to provide for adjustment the bar 79 has a longitudinal slot 81 receiving a stem 82 of a member 83 which is swivelled in the member 80, and a nut 84 is threaded on said stem 82 to clamp the bar 79 to the member 83. Thus, when the vise or work holder is adjusted angularly about the pivot 14, the nut 84 is loosened so that the bar 79 may remain in its longitudinal position, without shifting the eccentric 35 on the shaft 55, and after the vise has been adjusted the nut 84 is tightened. In this way, the angular adjustment of the vise will not adjust the eccentric.

In operation, the object to be operated on is placed in the vise or work holder, with the saw raised, and the screw 21 is then rotated to clamp the object between the jaws 18 and 19. The adjustment of the vise will automatically adjust the eccentric 35 so as to regulate the stroke of the saw to correspond with the width of the object, as hereinbefore described. The arm 43 is swung down so as to engage the saw blade 23, and the saw blade is allowed to rest on the object, the weight 39 having been adjusted to regulate the pressure of the saw blade on the object. Then, by swinging the lever 66 the bar 63 is pulled forwardly so that the cams 61 move together, and the spring 59 will shift the pulley wheel 56 to close the clutch, thereby rotating the shaft 55 with the wheel 56. The eccentric rotates with the shaft, and the saw is therefore reciprocated. During the forward movement of the saw, as hereinbefore explained, the tension on the spring 37 is relieved, so that the weight 39 will be active to press the saw blade down on the object, whereas during the return movement of the saw the spring 37 is stretched so that the tension thereof will counterbalance the weight 39, thereby relieving the pressure of the saw blade on the object, so that the saw can return freely. The arm 43 will hold the saw blade against transverse displacement, so that the saw blade will start down into the object properly, without being distorted. As the saw blade cuts down into the object, the flanges 45 seat on the object, and when the arm 43 has been swung slightly away from the saw blade by the downward movement of the saw, the lug 46 will snap past the lug 47, thereby swinging the arm 43 upwardly to remove it from the object. When the saw has cut through the object it swings down and the lug 67 during the forward movement of the saw will contact with the lug 66 and swing the lever 64, which will swing the lever 60 rearwardly so as to shift the pulley wheel 56 and open the clutch. The saw is therefore stopped as soon as the saw blade has cut through the object. Should the lug 67 contact with the lug 66 during the rearward movement of the saw, the lug 67 will ride over the lug 66 because the corresponding surfaces of the lugs are bevelled to prevent them from catching during the rearward movement of the saw.

The vise is then opened and the object removed, and the operation is repeated for the next object to be cut. If the objects cut are of varying sizes it will be noted that the opening and closing of the vise or work holder will automatically adjust the stroke of the saw. After the object has been placed in the vise or work holder and clamped, it is only necessary for the operator to press the arm 43 down into engagement with the saw blade and to move the lever 64 so as to close the clutch. The machine requires no further attention until the sawing operation has been completed, when the object is removed and replaced by the next one.

Having thus described the invention, what is claimed as new is:—

1. In a sawing machine, a rotatable shaft, an eccentric mounted adjustably on the shaft to change the eccentricity thereof, a saw operably connected with said eccentric, and means operably connected with said eccentric for adjusting same on the shaft in any angular position of the eccentric or during the rotation thereof.

2. In a sawing machine, a rotatable shaft, an eccentric mounted adjustably on the shaft to change the eccentricity thereof, a saw operably connected with said eccentric, and a member movable longitudinally of the axis of said shaft and operably connected with said eccentric for adjusting the eccentric on the shaft.

3. In a sawing machine, a rotatable shaft, an eccentric mounted on the shaft for sliding adjustment transversely of the shaft to change the eccentricity of the eccentric, a saw operably connected with said eccentric, a bar slidable in the shaft along the axis thereof, and a bar secured to the eccentric and crossing the aforesaid bar, said bars having interengaging oblique teeth to slidably adjust the eccentric on the shaft by the movement of the firstnamed bar along the axis of the shaft.

4. In a sawing machine, a shaft, a bar slidable in the shaft along the axis thereof, a second bar slidable in the shaft at right angles thereof, said bars having interengaging oblique teeth for sliding the second bar longitudinally thereof when the firstnamed bar is slid longitudinally, an eccentric secured to the second bar to be adjusted transversely of said shaft, and a saw operably connected with said eccentric.

5. In a sawing machine, a shaft, an eccentric rotatable therewith, a saw operably connected with the eccentric, an adjustable work holder, and an adjustable connection between said eccentric and shaft and controlled by the work holder for adjusting the eccentricity of said eccentric according to the adjustment of the work holder, to regulate the stroke of the saw.

6. In a sawing machine, a shaft, an eccentric rotatable with the shaft and slidable transversely thereof to change the eccentricity of the eccentric, a saw operably connected with said eccentric, an adjustable work holder having jaws movable toward and away from one another, and adjusting means between said shaft and eccentric for adjusting the eccentric relatively to the axis of the shaft and operably connected with said work holder to increase and decrease the eccentricity of the eccentric when said jaws are moved away from and toward one another.

7. In a sawing machine, an oscillatory lever, a saw having an arm pivotally connected with said lever, a shaft, a bar pivotally connected with said lever and having a crank motion connection with said shaft, and a spring connection between said bar and arm arranged to exert a lifting effect on the saw during the movement of the saw in one direction.

8. In a sawing machine, an oscillatory lever, a saw having an arm pivotally connected with said lever, a shaft, an eccentric rotatable with the shaft, a band on the eccentric, a bar secured to said band and pivotally connected with said lever, and a spring connection between said bar and arm operated on by said bar to exert a lifting effect on the saw during the movement of the saw in one direction.

9. In a sawing machine, a frame, a saw blade secured in said frame, a member movable with and relatively to said frame and having a portion to engage over the intermediate portion of the blade to prevent distortion of the blade when entering an object and adapted to bear slidably on the object when the blade enters the object, and means between said member and frame for holding said member in engagement with the blade yieldingly and for moving the member away from the blade when said member is separated a predetermined distance from the blade as the blade enters the object.

10. A hack saw comprising a frame, a saw blade secured in said frame, an arm pivotally connected with the frame and having a portion to engage over the intermediate portion of the blade to prevent distortion of the blade when entering an object and adapted to bear on the object when the blade enters the object, and means between said arm and frame for holding the arm in engagement with the blade yieldingly and for swinging the arm away from the blade when the arm is separated a predetermined distance from the blade as the blade enters the object.

In testimony whereof I hereunto affix my signature.

DANIEL C. SLAGHT.